(12) United States Patent  
Shiratori

(10) Patent No.: US 11,360,719 B2  
(45) Date of Patent: Jun. 14, 2022

(54) INFORMATION PROCESSING APPARATUS REDUCING A POSSIBILITY THAT THE CONTENT OF THE SETTING THAT A USER RECOGNIZES HAS BEEN MADE DIFFERS FROM THE CONTENT OF THE ACTUAL SETTING AND NON-TRANSITORY COMPUTER READABLE MEDIUM

(71) Applicant: FUJIFILM Business Innovation Corp., Tokyo (JP)

(72) Inventor: Kana Shiratori, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 191 days.

(21) Appl. No.: 16/565,507

(22) Filed: Sep. 10, 2019

(65) Prior Publication Data

US 2020/0097228 A1 Mar. 26, 2020

(51) Int. Cl.  
*G06F 3/12* (2006.01)
(52) U.S. Cl.  
CPC .......... *G06F 3/1208* (2013.01); *G06F 3/1255* (2013.01); *G06F 3/1256* (2013.01); *G06F 3/1286* (2013.01); *G06F 3/1292* (2013.01)
(58) Field of Classification Search  
None  
See application file for complete search history.

(56) References Cited

U.S. PATENT DOCUMENTS

| | | | |
|---|---|---|---|
| 2011/0013203 A1* | 1/2011 | Grosz | G06F 40/103 358/1.2 |
| 2011/0141492 A1* | 6/2011 | Ebuchi | H04N 1/3875 358/1.2 |
| 2012/0236357 A1* | 9/2012 | Cech | G06F 3/1288 358/1.15 |
| 2014/0092426 A1* | 4/2014 | Fujishita | G06K 15/005 358/1.15 |
| 2017/0001454 A1* | 1/2017 | Ito | H04N 1/00411 |
| 2017/0019559 A1* | 1/2017 | Ito | G06F 3/1204 |
| 2018/0307448 A1* | 10/2018 | Iwashita | G06F 3/1206 |
| 2018/0364954 A1* | 12/2018 | Tsuji | G06F 3/1205 |
| 2020/0213455 A1* | 7/2020 | Ogino | H04N 1/00233 |
| 2021/0250447 A1* | 8/2021 | Shiratori | H04N 1/00145 |

FOREIGN PATENT DOCUMENTS

JP 2006-310956 11/2006

* cited by examiner

*Primary Examiner* — Henok Shiferaw  
(74) *Attorney, Agent, or Firm* — JCIPRNET

(57) ABSTRACT

An information processing apparatus includes an image selection receiving unit, a change receiving unit, and a control unit. The image selection receiving unit receives selection of an image to be registered in a system that executes an image output process. The change receiving unit receives a change in setting related to output of the image which is selected via the image selection receiving unit. The control unit controls the change receiving unit such that, in a case where only one image is selected using the image selection receiving unit, the change receiving unit receives the change in setting related to output of the selected image, and such that, in a case where plural images are selected using the image selection receiving unit, the change receiving unit does not receive the change in setting related to output of the plural selected images.

9 Claims, 15 Drawing Sheets

INFORMATION PROCESSING APPARATUS REDUCING A POSSIBILITY THAT THE CONTENT OF THE SETTING THAT A USER RECOGNIZES HAS BEEN MADE DIFFERS FROM THE CONTENT OF THE ACTUAL SETTING AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-177196 filed Sep. 21, 2018.

BACKGROUND

(i) Technical Field

The present disclosure relates to an information processing apparatus and a non-transitory computer readable medium.

(ii) Related Art

Japanese Unexamined Patent Application Publication No. 2006-310956 discloses a print system including: a reading section that reads a plurality of image data files recorded in a recording medium; a determination unit that determines whether or not the number of pixels in an image designated in a received order is appropriate for preparation of a photo print of a designated print size; an image arrangement unit that arranges a plurality of images within a region of the print size, the images being designated by the received order and having a number of pixels determined by the determination unit as not being appropriate for preparation of a photo print of the print size; and a composite image data preparation unit that synthesizes an image data file related to the plurality of images which are arranged by the image arrangement unit, and that prepares composite image data corresponding to the print size.

SUMMARY

Aspects of non-limiting embodiments of the present disclosure relate to providing an information processing apparatus and a non-transitory computer readable medium that enable reducing a possibility that the content of the setting that a user recognizes has been made differs from the content of the actual setting, when attempting to register an image in a system that executes an image output process, compared to a case where setting related to image output is changeable uniformly both in the case where a single image is to be registered and in the case where a plurality of images are to be registered.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including: an image selection receiving unit that receives selection of an image to be registered in a system that executes an image output process; a change receiving unit that receives a change in setting related to output of the image which is selected via the image selection receiving unit; and a control unit that controls the change receiving unit such that, in a case where only one image is selected using the image selection receiving unit, the change receiving unit receives the change in setting related to output of the selected image, and such that, in a case where a plurality of images are selected using the image selection receiving unit, the change receiving unit does not receive the change in setting related to output of the plurality of selected images.

BRIEF DESCRIPTION OF THE DRAWINGS

An exemplary embodiment of the present disclosure will be described in detail based on the following figures, wherein.

DETAILED DESCRIPTION

Now, an exemplary embodiment of the present disclosure will be described in detail with reference to the drawings.

Figure 1:
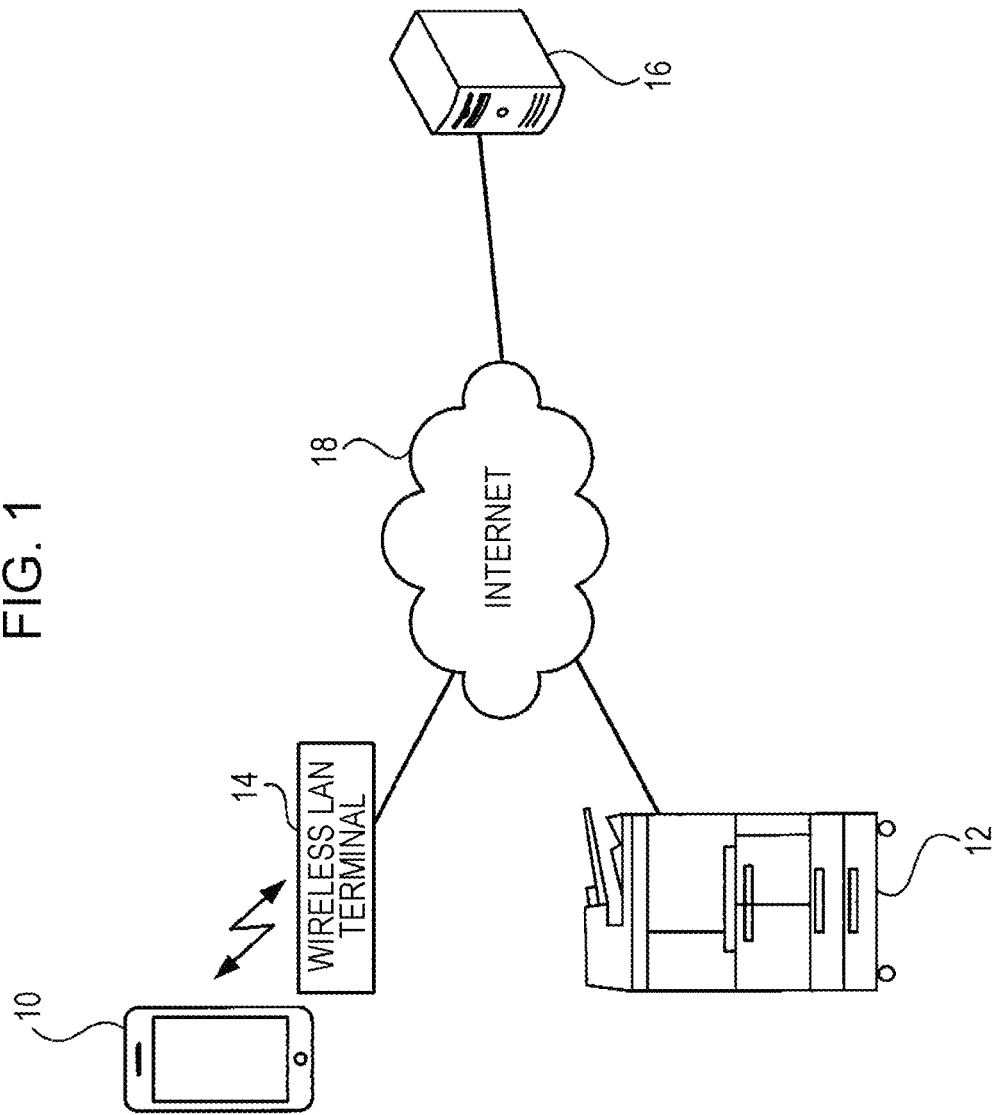
FIG. 1 illustrates the system configuration of a net print system according to an exemplary embodiment of the present disclosure.

FIG. 1 illustrates the configuration of a net print system according to an exemplary embodiment of the present disclosure.

In the net print system according to the present exemplary embodiment, photographs which are images to be output are registered in a net print server 16 by way of the Internet using a terminal apparatus 10 such as a smartphone or a tablet terminal, the net print server 16 is accessed from an image forming apparatus 12 installed in a convenience store or the like to download the registered photographs, and output processes such as photo printing, facsimile, and copy are executed to utilize various services. The image forming apparatus 12 is a so-called multi-function device that has a plurality of functions such as a printing function, a scanning function, a copying function, and a facsimile function.

In the following description, a smartphone is used as the terminal apparatus 10. The image forming apparatus 12 implements a function to execute an output process such as photo printing by downloading application software (hereinafter referred to as a "print app") for executing an image output process such as a photo print process.

In the net print system according to the exemplary embodiment of the present disclosure, as illustrated in FIG. 1, the image forming apparatus 12, a wireless local area network (LAN) terminal 14, and the net print server 16 which provides a net print service to a user are connected to each other via an Internet 18.

The terminal apparatus 10 is connected to the wireless LAN terminal 14 through a wireless line to be connected to the net print server 16.

Figure 2:
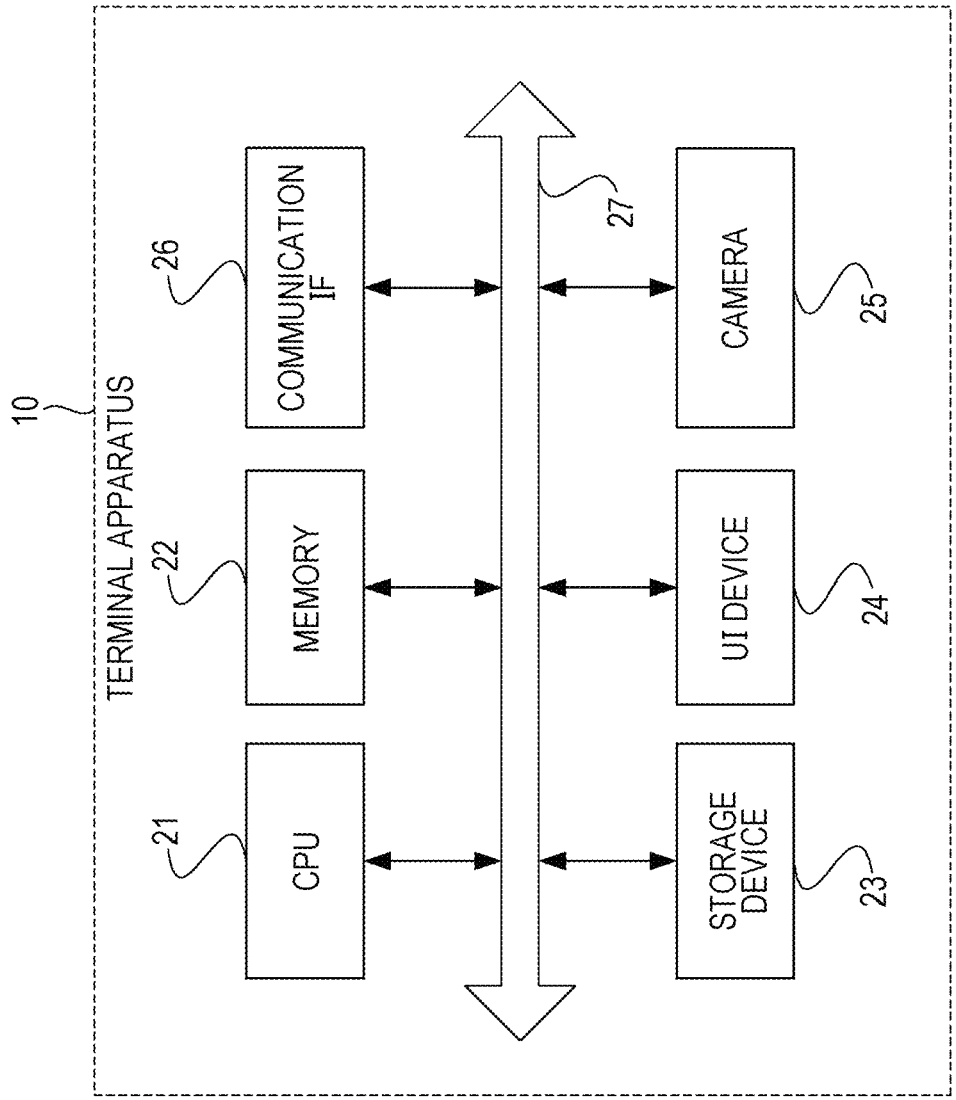
FIG. 2 is a block diagram illustrating the hardware configuration of a terminal apparatus 10 according to the exemplary embodiment of the present disclosure.

Next, the hardware configuration of the terminal apparatus 10 in the net print system according to the present exemplary embodiment is illustrated in FIG. 2.

As illustrated in FIG. 2, the terminal apparatus 10 includes a central processing unit (CPU) 21, a memory 22, a storage device 23 such as a flash memory, a user interface (UI) device 24 such as a touch screen, a camera 25, and a communication interface (IF) 26 that transmits and receives data to and from the wireless LAN terminal 14 via the wireless line. Such components are connected to each other via a control bus 27.

The CPU 21 controls operation of the terminal apparatus 10 by executing a predetermined process on the basis of a control program stored in the memory 22 or the storage device 23. In the present exemplary embodiment, the CPU 21 reads and executes the control program which is stored in the memory 22 or the storage device 23. However, such a program may be stored in a storage medium such as a Secure Digital (SD) card to be provided to the CPU 21.

Figure 3:
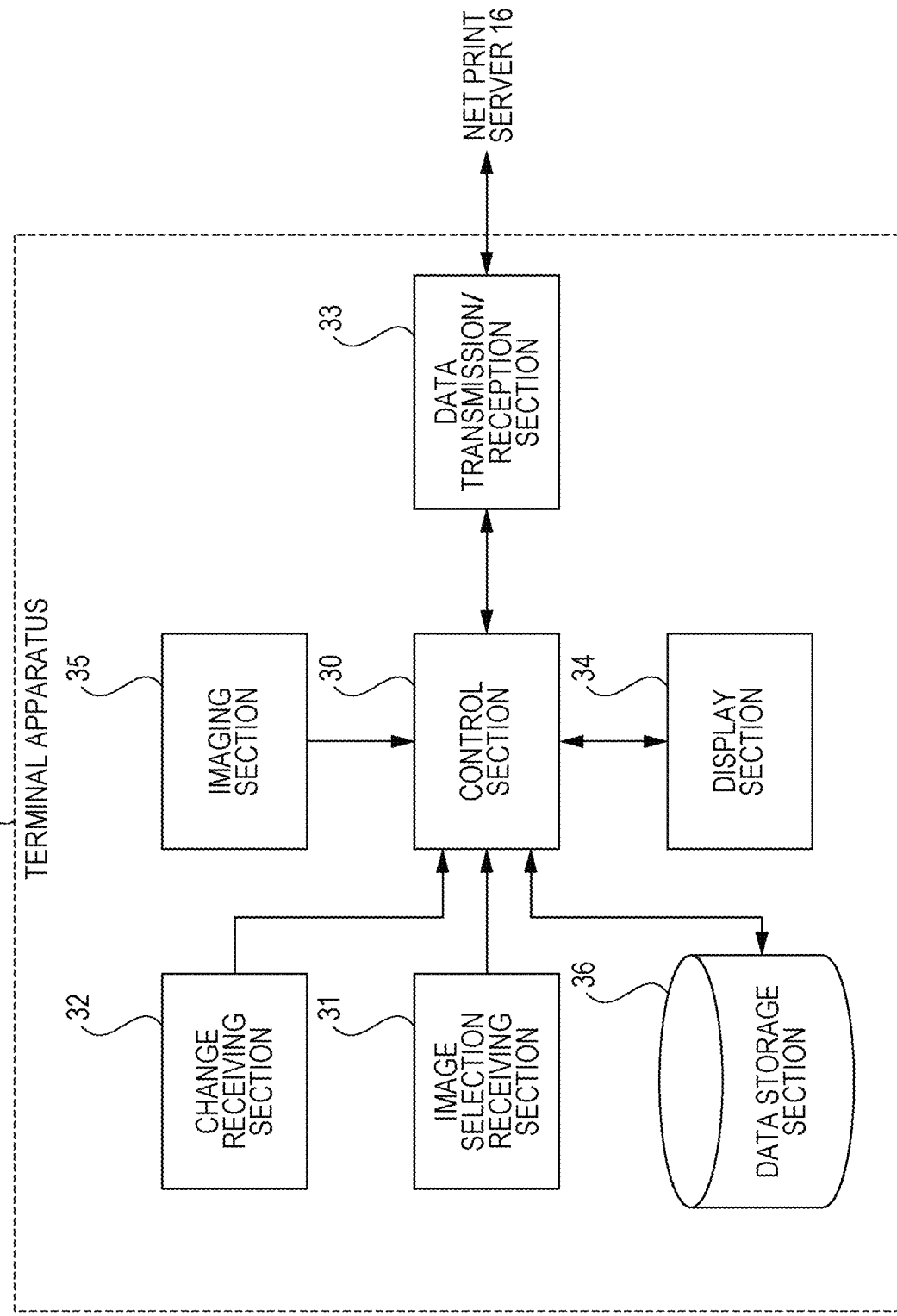
FIG. 3 is a block diagram illustrating the functional configuration of the terminal apparatus 10 according to the exemplary embodiment of the present disclosure.

FIG. 3 is a block diagram illustrating the functional configuration of the terminal apparatus 10 which is implemented by executing the control program for the print app described above.

As illustrated in FIG. 3, the terminal apparatus 10 according to the present exemplary embodiment includes a control section 30, an image selection receiving section 31, a change receiving section 32, a data transmission/reception section 33, a display section 34, an imaging section 35, and a data storage section 36.

The data transmission/reception section 33 transmits and receives data to and from the net print server 16 on the basis of control by the control section 30.

The imaging section 35 functions as an imaging unit that images the real space on the basis of control by the control section 30.

The data storage section 36 stores various data such as photographs captured by the imaging section 35 on the basis of control by the control section 30.

The display section 34 functions as a display unit that displays various data such as photographs and an operation screen on the basis of control by the control section 30.

The image selection receiving section 31 receives selection of a photograph to be registered in the net print server 16 on the basis of control by the control section 30.

The control section 30 performs control so as to display a selected photograph on the operation screen in the case where the image selection receiving section 32 receives selection of the photograph.

The control section 30 also performs control such that, in the case where selection of one or a plurality of photographs is received by the image selection receiving section 31, the display section 34 displays a preview of one specific photograph selected from the one or plurality of photographs in a state in which selection of the one or plurality of photographs is received.

The change receiving section 32 receives a change in setting related to output for printing a photograph selected via the image selection receiving section 31 in a state in which a preview of one specific photograph is displayed on the basis of control by the control section 30.

The change receiving section 32 also receives a change in setting related to output for printing a selected photograph in accordance with the number of photographs selected using the image selection receiving section 31 on the basis of control by the control section 30.

Specifically, in the case where only one photograph is selected using the image selection receiving section 31, the control section 30 controls the change receiving section 32 so as to receive a change in setting related to output for printing the selected photograph.

In the case where a plurality of photographs are selected using the image selection receiving section 31, meanwhile, the control section 30 controls the change receiving section 32 so as not to receive a change in setting related to output for printing the plurality of selected photographs.

Specifically, in the case where a plurality of photographs are selected using the image selection receiving section 31, the control section 30 controls the change receiving section 32 so as not to receive a change in setting related to output for printing the photographs such as the paper size and the color mode, for example, by graying out setting buttons for such setting items.

In the case where a plurality of photographs are selected using the image selection receiving section 31, in addition, the control section 30 controls the display section 34 so as not to display a setting item for which a change in setting related to output for printing the photographs is not received, such as "slightly reduced" indicated in FIG. 4 to be discussed later, for example.

In the case where selection of a plurality of photographs is received by the image selection receiving section 31 after a change in setting related to output such as setting for photo print is received by the change receiving section 32 in a state in which only one photograph is selected using the image selection receiving section 31, the control section 30 performs control such that the display section 34 displays a warning that the setting which has been changed via the change receiving section 32 is returned to an initial state before the change. The control section 30 performs control such that the display section 34 continuously displays this warning until the user performs an operation. In the case where the selected photograph is a photograph, such as a panoramic photograph, that does not match the aspect ratio of the size of photo paper L in the initial state, further, the control section 30 performs control so as to extract the center portion of the photograph as the print range.

In the case where a plurality of photographs are selected using the image selection receiving section 31, meanwhile, the control section 30 performs control such that the display section 34 displays a warning that a change in setting related to output such as setting for photo print, which is made using the change receiving section 32, is not received. The control section 30 performs control such that this warning is dismissed from the display section 34 after a preset time, e.g. three seconds, elapses since the warning is displayed on the display section 34.

Next, an example of a specific operation performed using the terminal apparatus 10 according to the present exemplary embodiment will be described with reference to FIGS. 4 to 11.

Figure 4:
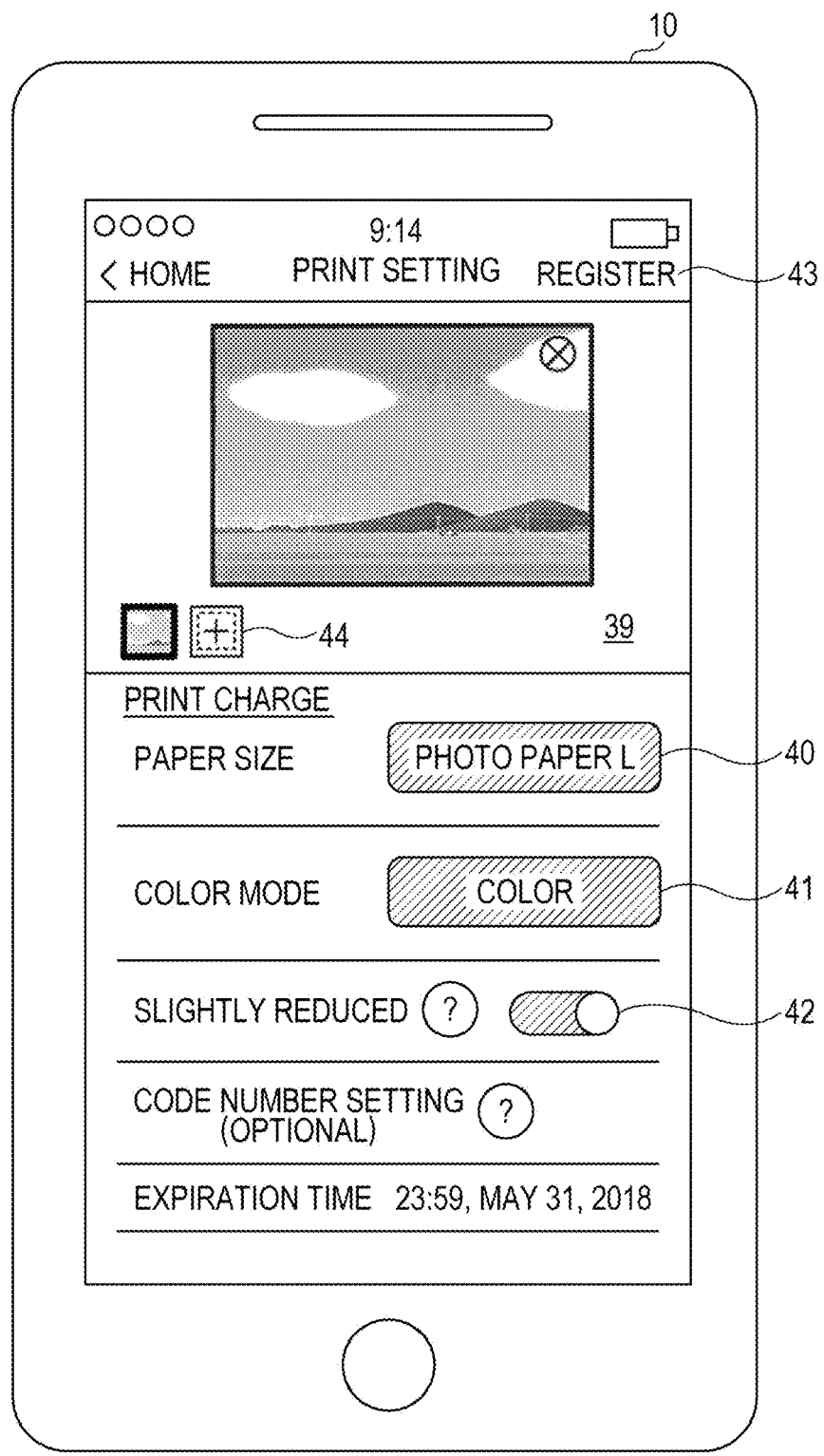
FIG. 4 illustrates a display screen example of an operation screen of the terminal apparatus 10 according to the exemplary embodiment of the present disclosure.

First, an example of a print setting screen for a case where the print app which is installed in the terminal apparatus 10 is started and one photograph is selected is illustrated in FIG. 4.

A photograph to be subjected to a print process, a thumbnail image obtained by reducing the photograph to be subjected to the print process, and an addition button 44 that is used to register second and subsequent photographs are displayed in an upper space 39 of the operation screen illustrated in FIG. 4. In addition, setting items such as "paper size", "color mode", "slightly reduced", and "code number setting" and setting buttons 40 to 42 that are used to change the setting for such setting items are displayed on the lower side of the operation screen. The setting item "slightly reduced" is used to print the photograph as slightly reduced compared to the set size in order to suppress the edge of the photograph lying off the print. The thumbnail image refers to an image obtained by reducing an image such as a photograph in order to enhance viewability.

In the initial setting (initial state) for each setting item, the paper size is "photo paper L", the color mode is "color", and the "slightly reduced" toggle is "on".

That is, as illustrated in FIG. 4, in the case where only one photograph is selected using the image selection receiving section 31, the control section 30 controls the change receiving section 32 so as to receive a change in setting for the setting items, such as the paper size and the color mode, for printing the selected photograph.

That is, the setting is changed when one of the setting buttons 40 to 42 for a setting item, the setting for which is desired to be changed from the initial state, is depressed (touched) to be selected. Then, when a registration button 43 is touched, setting information related to the print setting at the time of the touch is transmitted to the net print server 16 so that the setting is registered in the net print server 16. The operation screen of the terminal apparatus 10 also displays an "expiration time", until which the information is saved in the net print server 16.

Figure 5A:
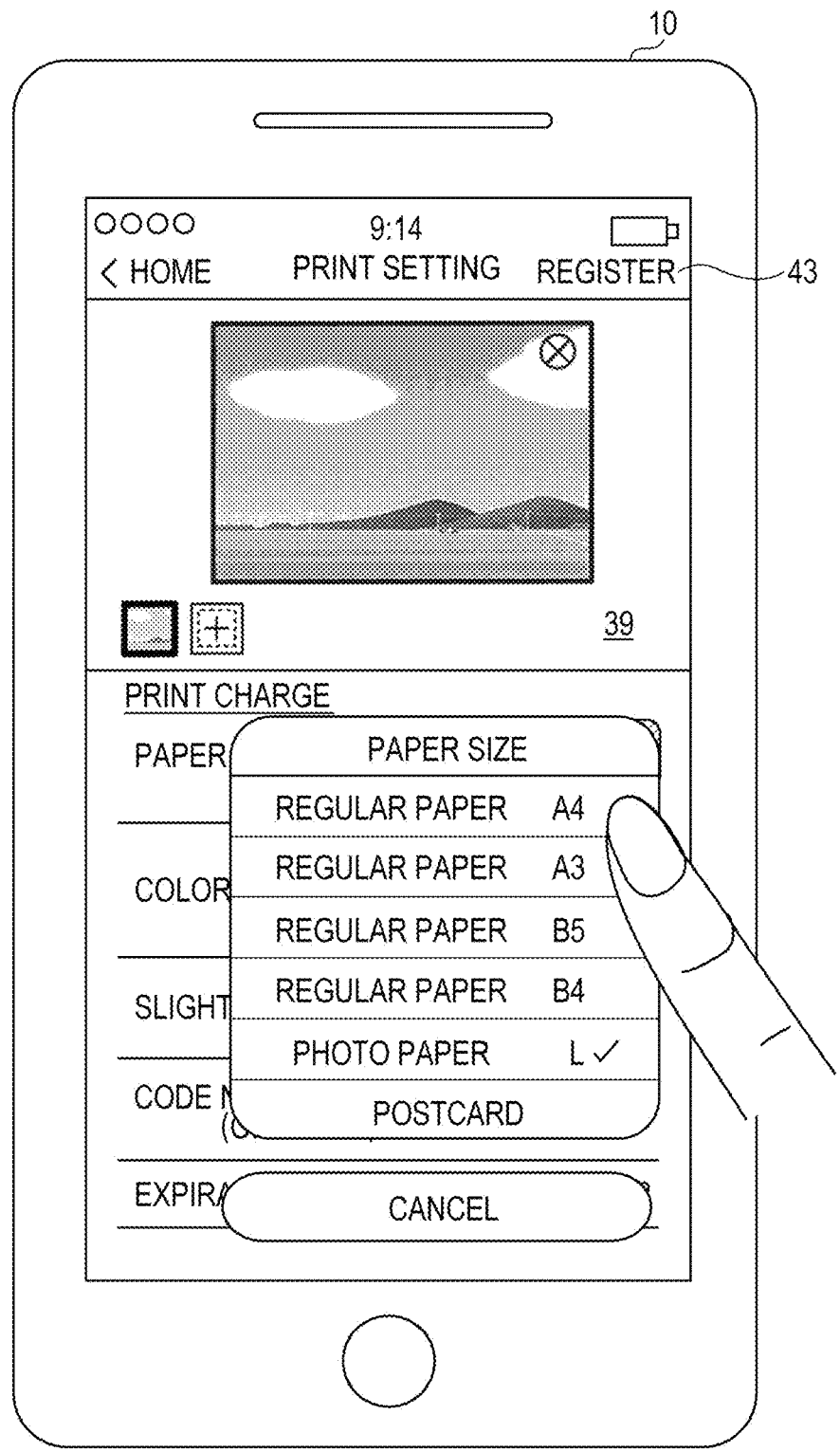
FIGS. 5A and 5B illustrate a display screen example illustrating a specific operation performed using the terminal apparatus 10 according to the exemplary embodiment of the present disclosure.
Figure 5B:
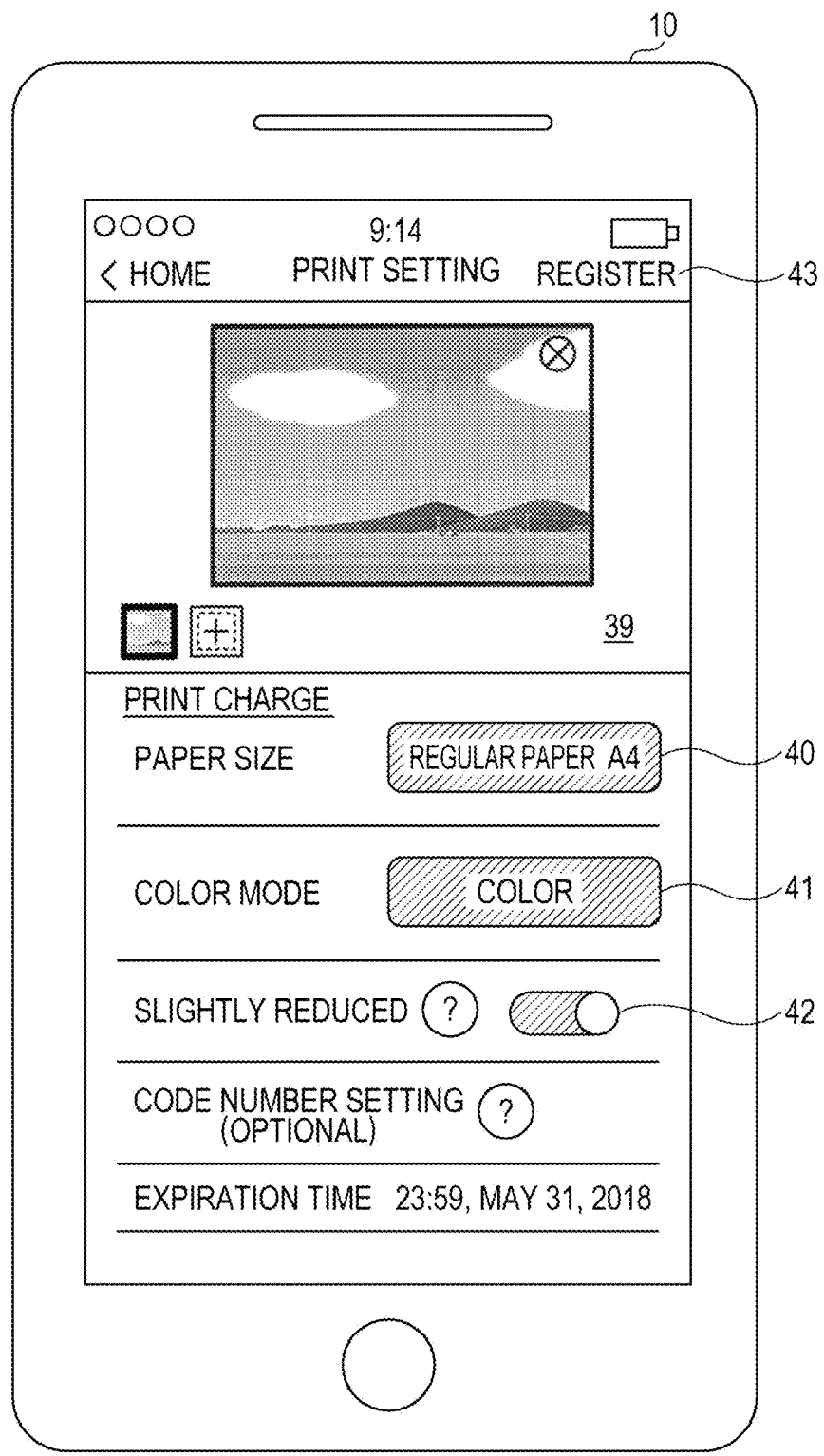

Specifically, in the case where it is desired to change the setting for the paper size, a paper size change selection screen illustrated in FIG. 5A is displayed by touching the setting button 40. Then, when "regular paper A4" is selected, for example, the setting for the paper size is changed from "photo paper L" as the initial state to "regular paper A4" as illustrated in FIG. 5B. Similarly, by touching the setting button 41 for the color mode, a color mode change selection screen is displayed to allow the user to select to change the setting for the color mode. Then, when the registration button 43 is touched, setting information at the time of the touch is transmitted to the net print server 16 to be registered and saved in the net print server 16. At this time, a reservation number is transmitted from the net print server 16 to the terminal apparatus 10.

Then, the registered photograph may be downloaded to execute photo printing by accessing the net print server 16 from the image forming apparatus 12 which is installed in a convenience store or the like using the reservation number.

Figure 6A:
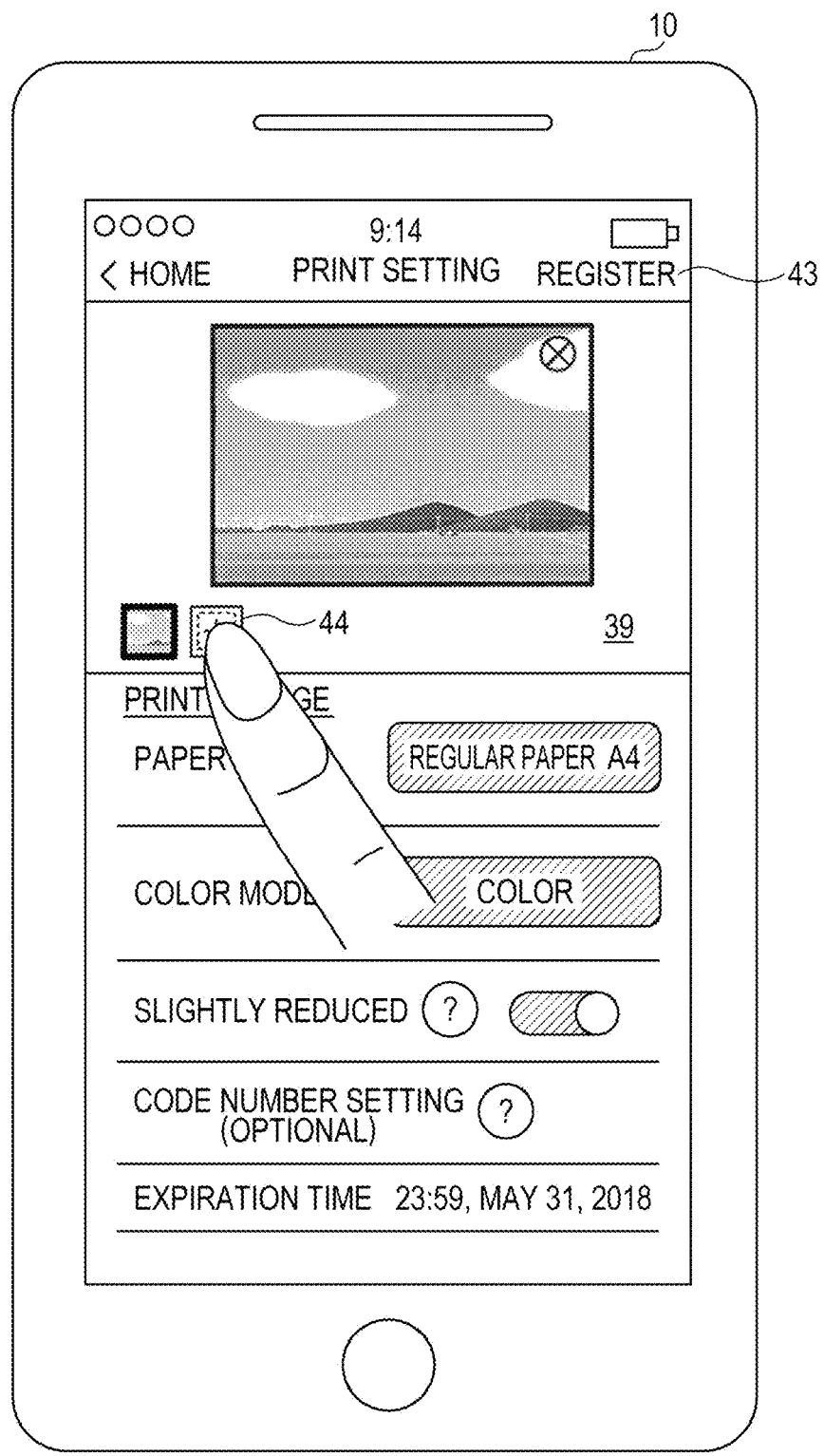
FIGS. 6A and 6B illustrate a display screen example illustrating a specific operation performed using the terminal apparatus 10 according to the exemplary embodiment of the present disclosure.
Figure 6B:
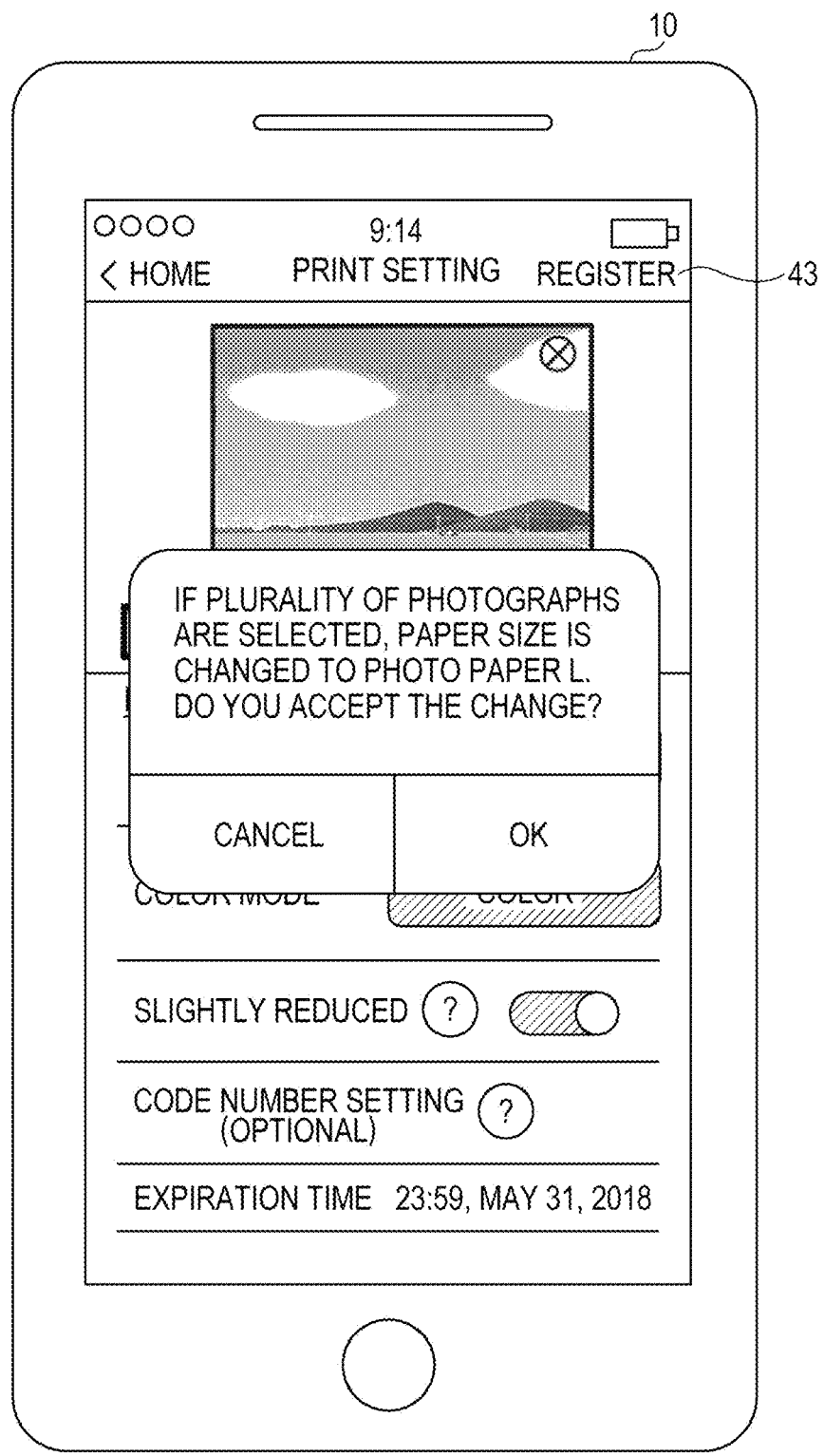

Next, operation of the operation screen for a case where the addition button 44 is touched after a change in setting related to output for printing a photograph is made will be described with reference to FIGS. 6A and 6B.

A plurality of photographs may be selected by touching the addition button 44 on the operation screen of the terminal apparatus 10 so that the setting for the plurality of photographs is registered in the net print server 16.

In the case where photographs are added by touching the addition button 44 after a change in setting related to output for printing a photograph is made, however, the setting for each setting item is returned to the initial state discussed above. Specifically, in the case where photographs are added by touching the addition button 44 as illustrated in FIG. 6A after the paper size is changed to "regular paper A4" in a state in which one photograph is selected as illustrated in FIGS. 5A and 5B discussed above, the display section 34 displays a warning that the changed setting related to the paper size is returned to "photo paper L" as the initial state before the change as illustrated in FIG. 6B.

Then, when the user touches the OK button, the setting related to the paper size is returned to "photo paper L" as the initial state. The second and subsequent photographs may be selected by touching the addition button 44. When the registration button 43 is touched, setting information at the time of the touch is transmitted to the net print server 16 to be registered and saved in the net print server 16. Then, the plurality of registered photographs may be downloaded to execute photo printing by accessing the net print server 16 from the image forming apparatus 12 which is installed in a convenience store or the like using the reservation number.

Figure 7:
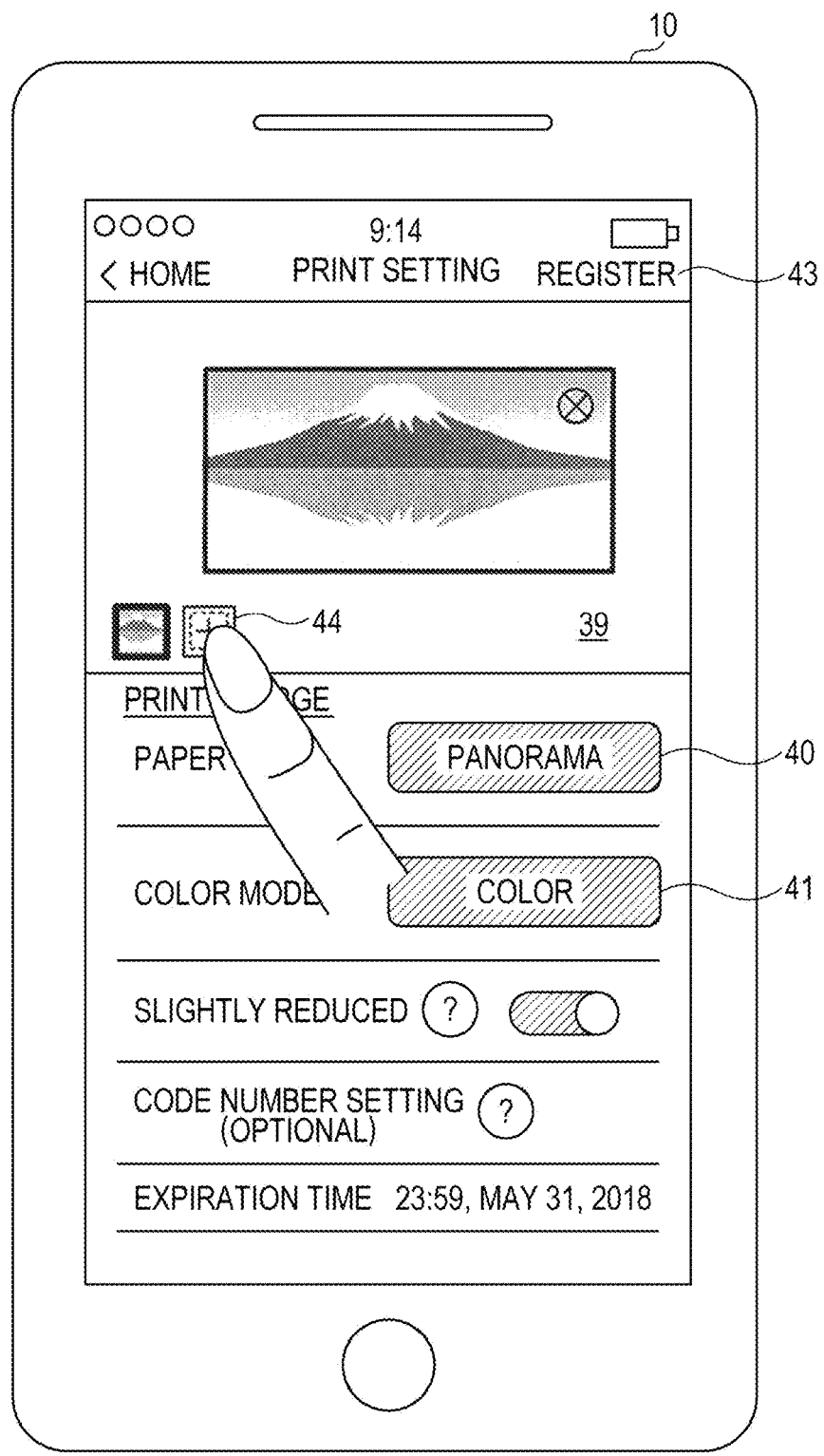
FIG. 7 illustrates a display screen example illustrating a specific operation performed using the terminal apparatus 10 according to the exemplary embodiment of the present disclosure.
Figure 8:
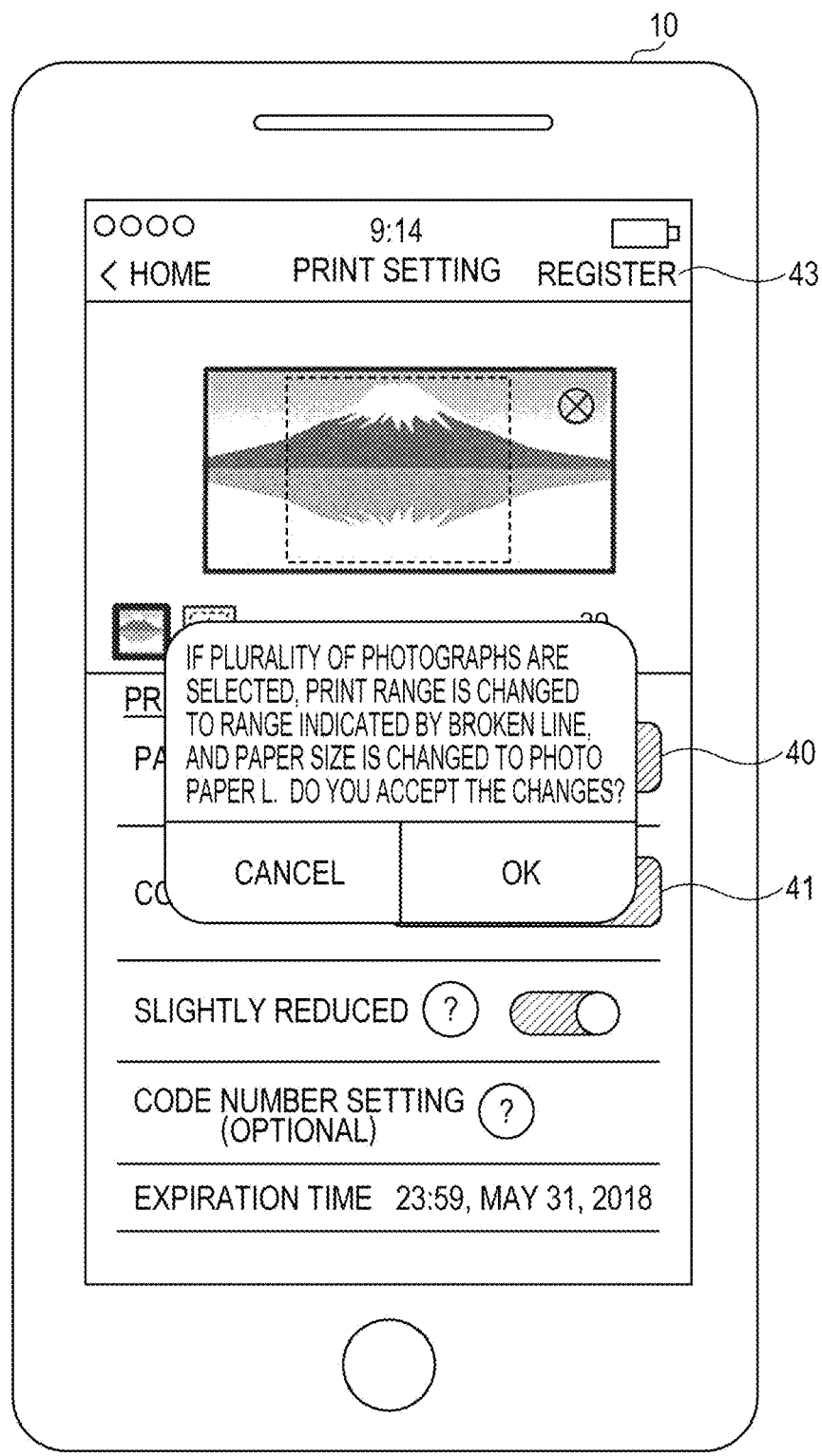
FIG. 8 illustrates a display screen example illustrating a specific operation performed using the terminal apparatus 10 according to the exemplary embodiment of the present disclosure.

Next, operation of the operation screen of the terminal apparatus 10 for a case where the addition button 44 is touched after one panoramic photograph is selected on the operation screen and the paper size is changed from the initial state to the panorama size will be described with reference to FIGS. 7 and 8.

In the case where the photograph which is selected using the image selection receiving section 31 is a panoramic photograph, the "panorama" size is displayed on the paper size change selection screen in accordance with attribute information on the selected photograph. Then, when the addition button 44 is touched after the setting for the paper size is changed by selecting the panorama size as illustrated in FIG. 7, the display section 34 displays a warning that the center portion of the panoramic photograph is extracted as the print range and that the changed setting for the panorama size is returned to "photo paper L" as the initial state before the change as illustrated in FIG. 8.

That is, in the case where the selected photograph is a photograph, such as a panoramic photograph, that does not match the aspect ratio of the size of photo paper L in the initial state, the control section 30 performs control so as to extract the center portion of the photograph as the print range. The print range for the panoramic photograph may be changed by the user on the preview screen.

Then, when the user touches the OK button, the setting related to the paper size is returned to "photo paper L" as the initial state. The second and subsequent photographs may be selected by touching the addition button 44. When the registration button 43 is touched, setting information at the time of the touch is transmitted to the net print server 16 to be registered and saved in the net print server 16. Then, the plurality of registered photographs may be downloaded to execute photo printing by accessing the net print server 16 from the image forming apparatus 12 which is installed in a convenience store or the like using the reservation number.

Figure 9:
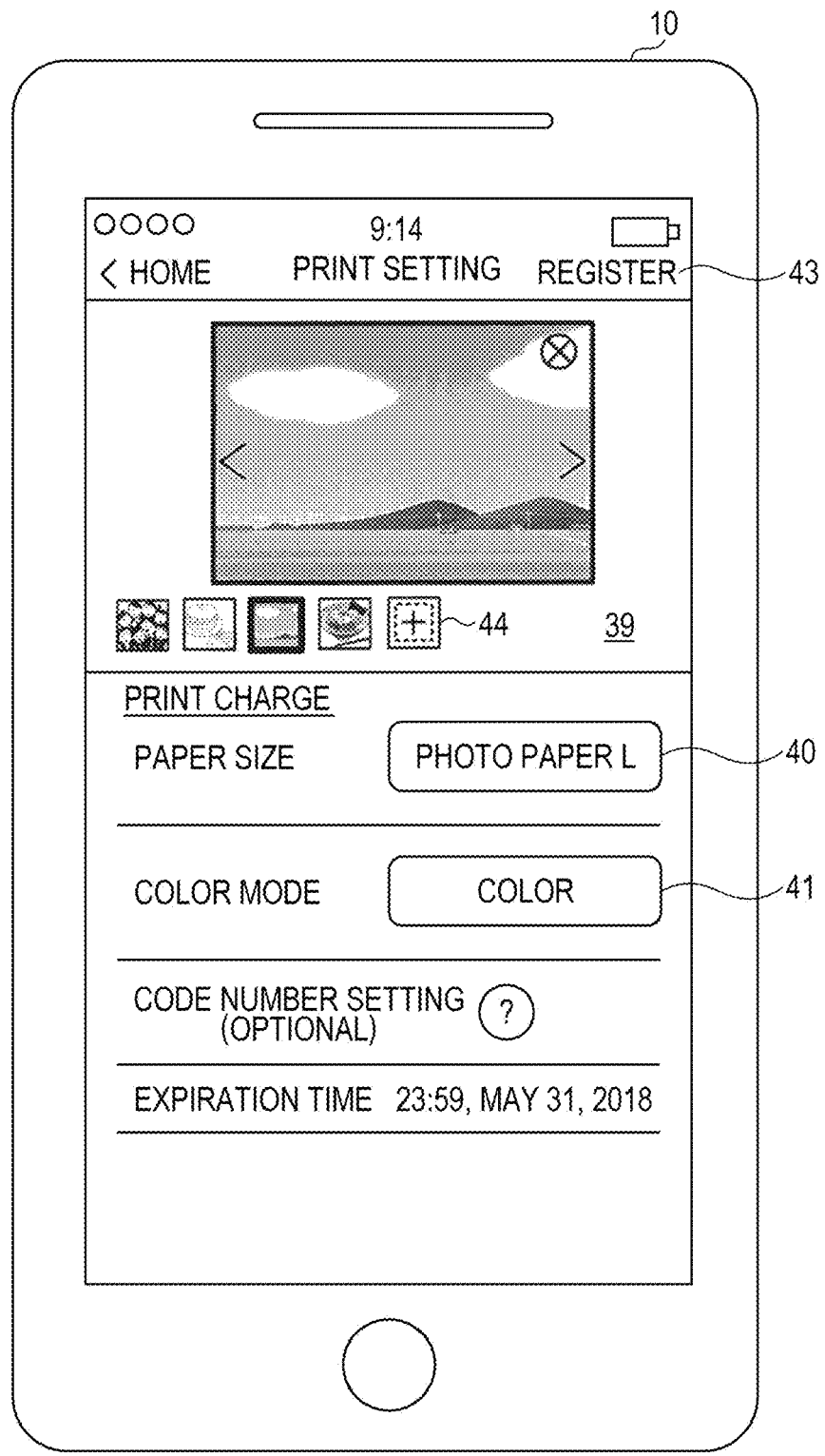
FIG. 9 illustrates a display screen example illustrating a specific operation performed using the terminal apparatus 10 according to the exemplary embodiment of the present disclosure.

Next, an example of a print setting screen for a case where the print app which is installed in the terminal apparatus 10 is started and a plurality of photographs are selected using the addition button 44 is illustrated in FIG. 9.

A photograph being previewed, a plurality of thumbnail images including a thumbnail image obtained by reducing the photograph being previewed, and the addition button 44 are displayed in the upper space 39 of the operation screen illustrated in FIG. 9. A thumbnail image selected from the plurality of thumbnail images is previewed as enlarged. The thumbnail image being previewed may be changed by swiping to the right or the left on the photograph being previewed. The "swiping" refers to an operation to sliding a finger on the screen.

That is, the control section 30 performs control such that, in the case where selection of a plurality of photographs is received by the image selection receiving section 31, and in a state in which selection of a plurality of photographs is received, one specific photograph selected from the plurality of photographs is displayed to be larger than other photographs on the display section 34.

In addition, setting items such as "paper size", "color mode", and "code number setting" and setting buttons 40 and 41 that are used to change the setting for such setting items are displayed on the lower side of the operation screen. At this time, the setting buttons 40 and 41 are displayed as grayed out to be inactive so as not to receive a change in setting.

That is, in the case where a plurality of photographs are selected, the control section 30 controls the change receiving section 32 such that the setting button 40 is not selectable not to receive a change in setting for the paper size. In the case where a plurality of photographs are selected, in addition, the control section 30 controls the change receiving section 32 such that the setting button 41 is not selectable not to receive a change in setting for the color mode. In the case where a plurality of photographs are selected, the control section 30 performs control so as not to display the setting item "slightly reduced" which is displayed on the operation screen in the case where only one photograph is selected as illustrated in FIG. 4.

Specifically, in the case where a plurality of photographs are selected, the print setting is fixed to the initial state discussed above, in which the paper size is "photo paper L", the color mode is "color", and the "slightly reduced" toggle is "on". In order for the user to recognize that such setting is not changeable, the setting buttons 40 and 41 are displayed as grayed out to be inactive. In addition, the setting item "slightly reduced" is not displayed.

Figure 10A:
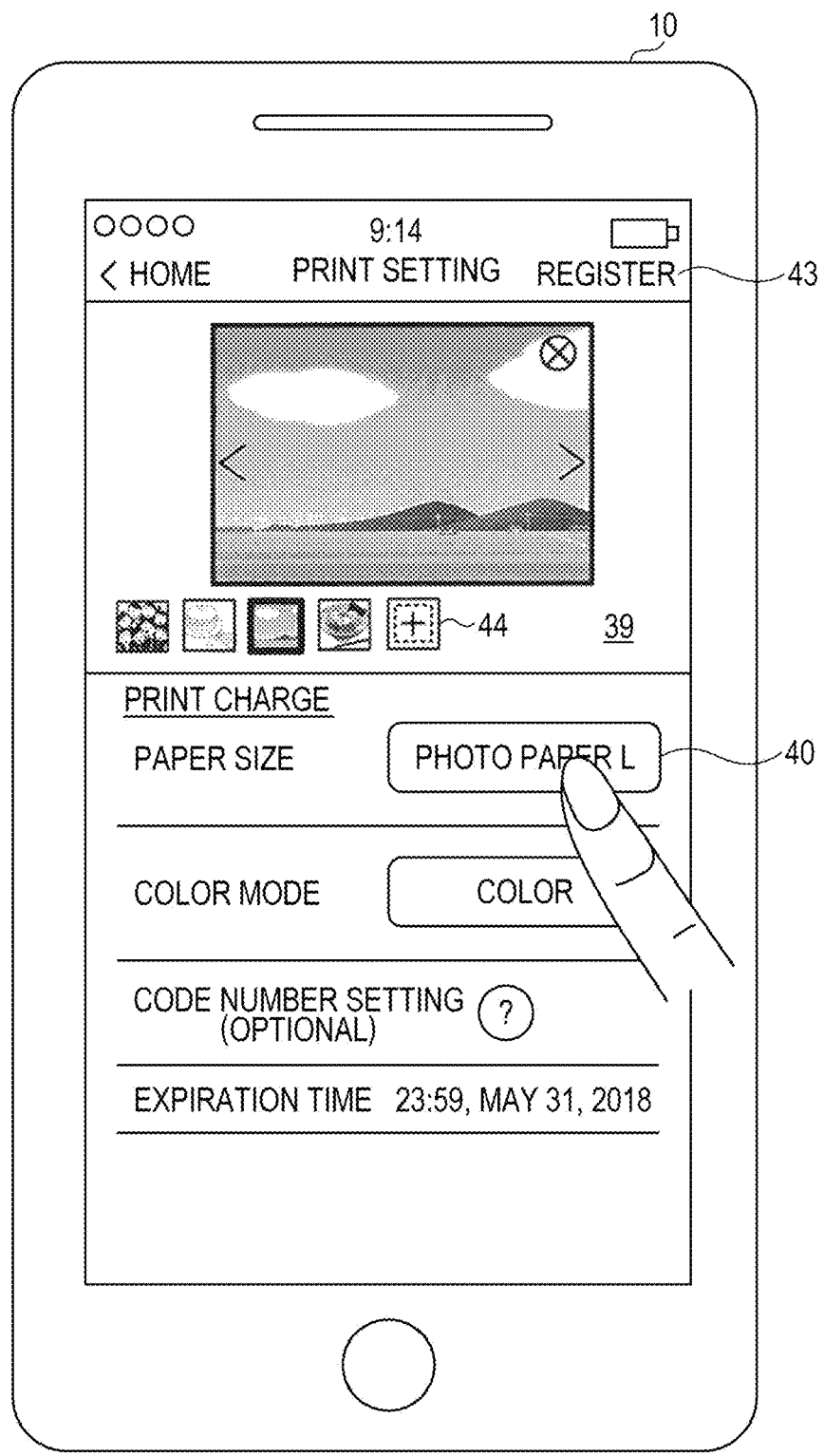
FIGS. 10A and 10B illustrate a display screen example illustrating a specific operation performed using the terminal apparatus 10 according to the exemplary embodiment of the present disclosure.
Figure 10B:
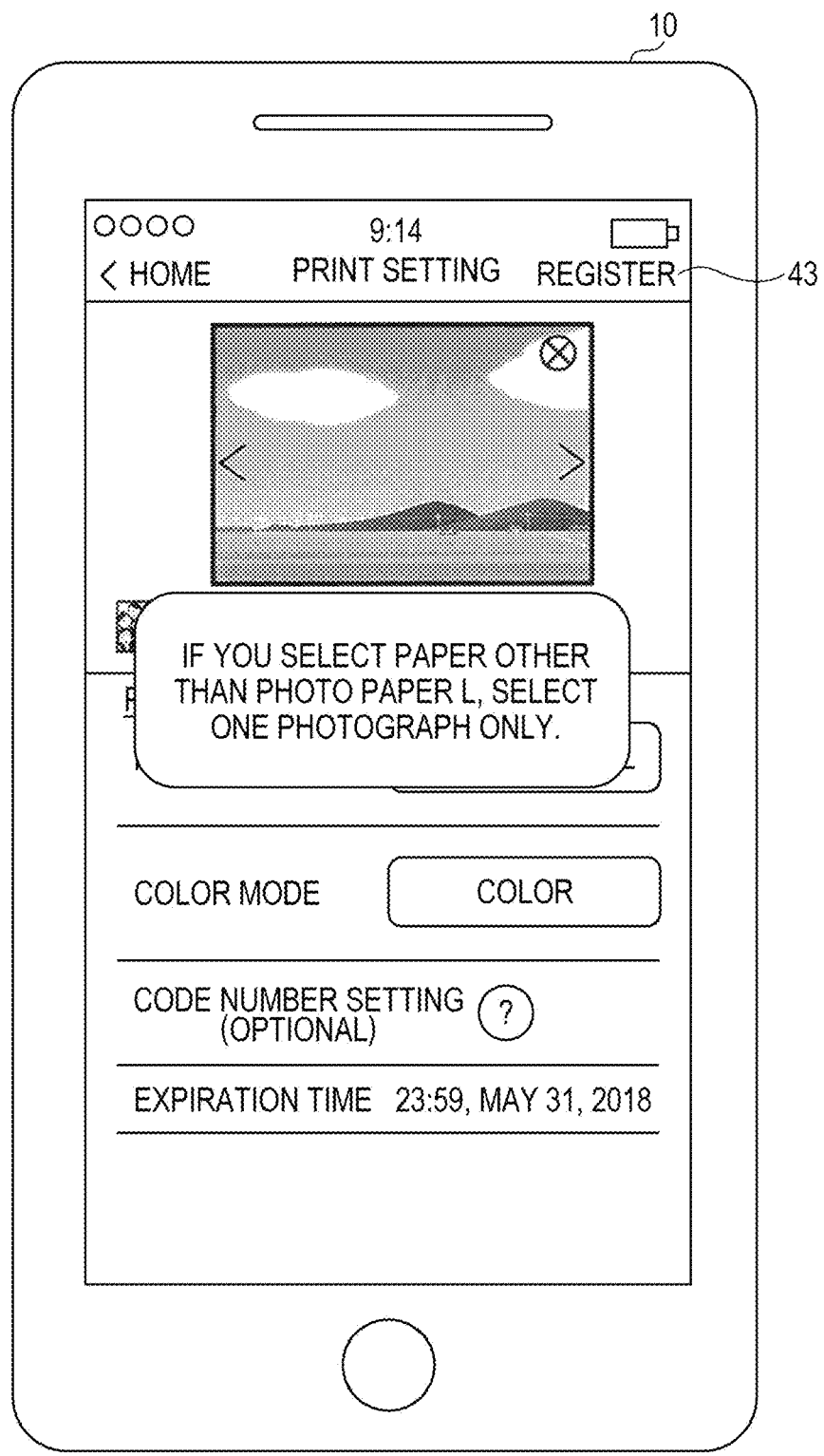
Figure 11A:
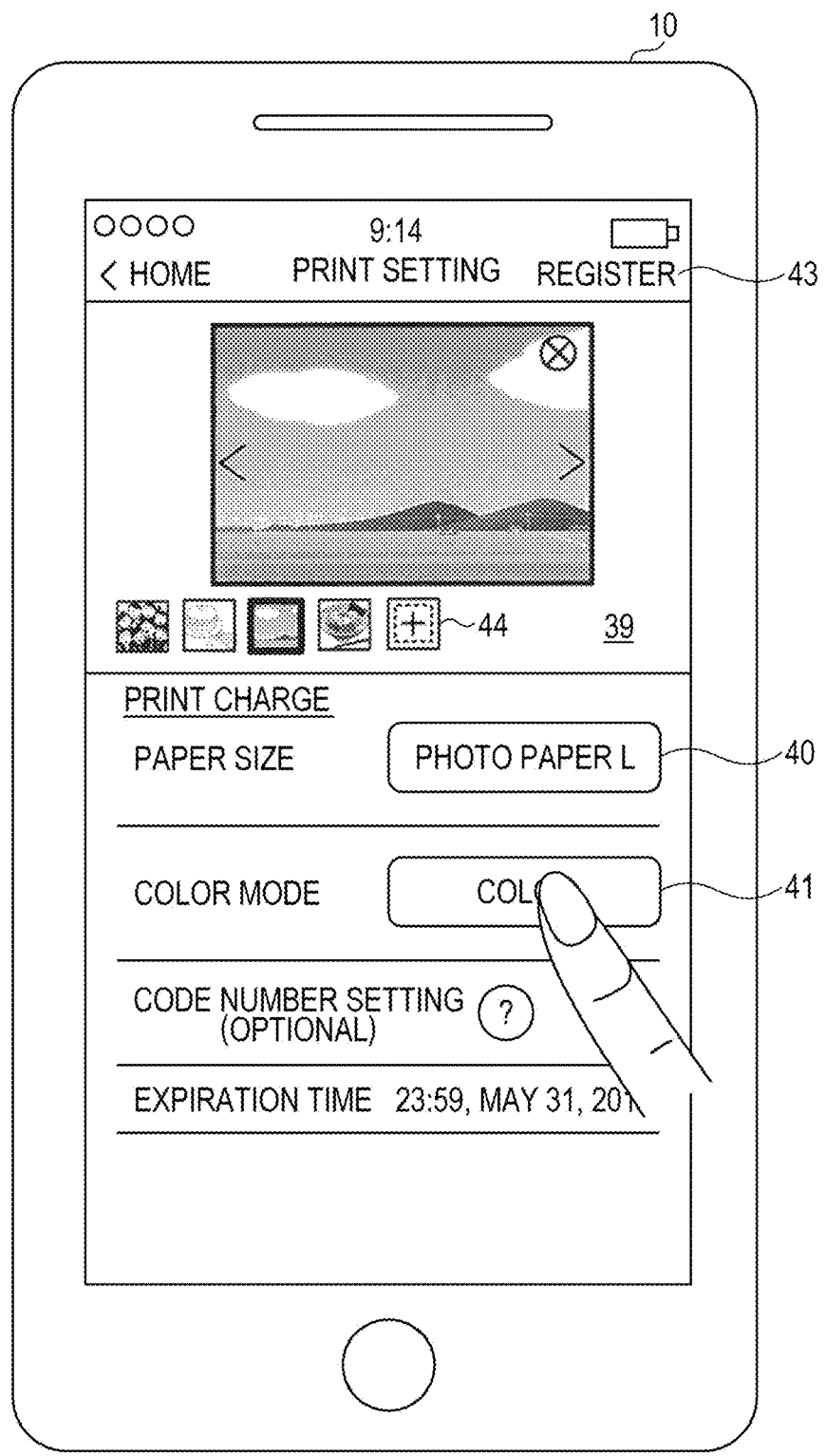
FIGS. 11A and 11B illustrate a display screen example illustrating a specific operation performed using the terminal apparatus 11 according to the exemplary embodiment of the present disclosure.
Figure 11B:
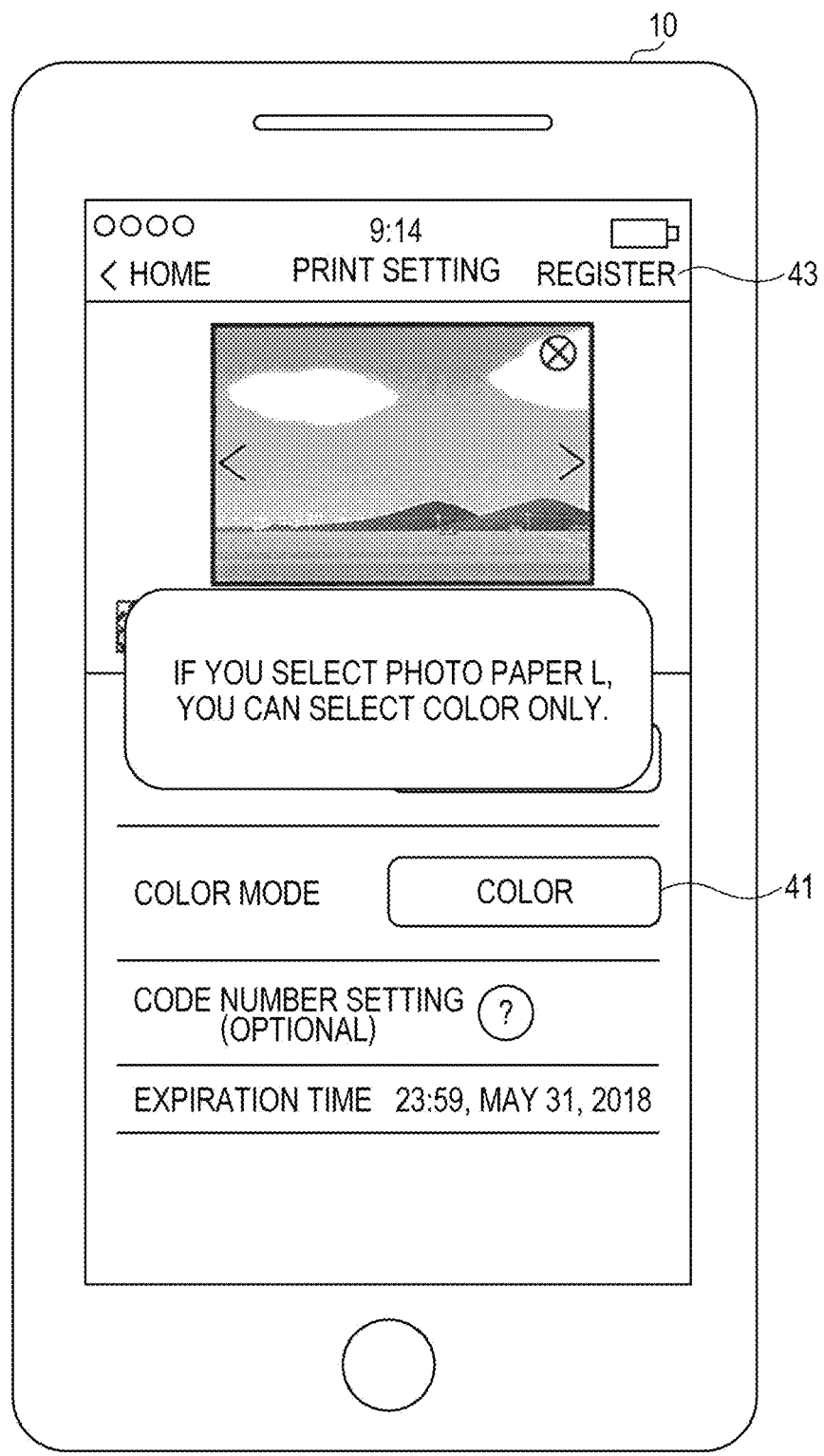

Then, in the case where the setting button 40 for the paper size is touched in a state in which a plurality of photographs are selected as illustrated in FIG. 10A, the display section 34 displays a warning that a change in setting for the paper size is not received as illustrated in FIG. 10B. In the case where the setting button 41 for the color mode is touched in a state in which a plurality of photographs are selected and the paper size is set to "photo paper L" as illustrated in FIG. 11A, meanwhile, the display section 34 displays a warning that a change in setting for the color mode is not received as illustrated in FIG. 11B. The control section 30 performs control such that this warning is dismissed after a preset time, e.g. three seconds, elapses since the warning is displayed on the display section 34.

Then, when the registration button 43 is touched, setting information in which the setting related to output for printing the photographs is the initial state is transmitted to the net print server 16 to be registered and saved in the net print server 16. At this time, a reservation number is transmitted from the net print server 16 to the terminal apparatus 10.

Then, the plurality of registered photographs may be downloaded to execute photo printing by accessing the net print server 16 from the image forming apparatus 12 which is installed in a convenience store or the like using the reservation number.

Modifications

In the exemplary embodiment described above, the present disclosure is applied to a terminal apparatus such as a smartphone as an information processing apparatus. However, the present disclosure is not limited thereto. The present disclosure may similarly be applied also to other information processing apparatuses, such as tablet terminal apparatuses and personal computers, with a larger display section 34 than that of terminal apparatuses such as smartphones.

In the exemplary embodiment described above, in the case where a plurality of photographs are selected, the setting buttons 40 and 41 for the paper size and the color mode are displayed as grayed out, and a warning that a change in setting is not received is displayed in the case where the setting buttons 40 and 41 are touched. However, the present disclosure is not limited thereto. The setting items for the paper size and the color mode may not be displayed.

In the exemplary embodiment described above, in the case where a plurality of photographs are selected, the control section 30 controls the change receiving section 32 so as not to receive a change in setting for photo print or the like. However, the present disclosure is not limited thereto. The control section 30 may also control the change receiving section 32 so as to receive a change in setting for printing selected photographs or the like, even in the case where a plurality of photographs are selected, in the case where photographs to be subjected to a change in setting and photographs not to be subjected to a change in setting are identifiable on the display section 34 in a state in which a plurality of photographs are selected using the image selection receiving section 31.

At this time, the control section 30 controls the change receiving section 32 so as to receive, or not to receive, a change in setting for printing the selected photographs or the like by acquiring attribute information added to the selected photographs, information related to the image size of the display section 34, or the like.

Specifically, in the case where it is desired to change the setting for the color mode of specific photographs, among a plurality of photographs, from "color" to "monochrome", for example, and photographs to be subjected to the change in setting and photographs not to be subjected to the change in setting are identifiable on the display section 34 by the user in accordance with the size of preview display, the size of the operation screen of the display section 34, etc., the setting may be changed to "monochrome" for only the photographs to be subjected to the change in setting.

In this case, the change receiving section 32 receives a change in setting for "monochrome" output of a photograph selected via the image selection receiving section 31 in a state in which one specific photograph to be subjected to the change in setting is previewed to be larger than other photographs.

Meanwhile, in the case where it is desired to add meta information such as a date to specific photographs, among a plurality of photographs, for example, and dated photographs to be subjected to the addition and non-dated photographs not to be subjected to the addition are identifiable on the display section 34 by the user in accordance with the size of preview display, the size of the operation screen of the display section 34, etc., the setting may be changed to "dated" for only the photographs to be subjected to the addition.

In the exemplary embodiment described above, in the initial setting for each setting item, the paper size is "photo paper L", the color mode is "color", and the "slightly reduced" toggle is "on". However, the present disclosure is not limited thereto. The initial setting for setting items related to image output such as the paper size and the color mode may be determined on the basis of the extension of the file name of an image selected using the image selection receiving section 31 etc.

Specifically, control may be performed such that the paper size is "regular paper A4" and the color mode is "monochrome" as the initial setting, or "photo paper L" is not displayed on the change selection screen, in the case where the extension of the file name of a selected image is not JPEG or PNG, e.g. document data which may not be output to photo paper.

An exemplary embodiment of the present disclosure has been specifically described above. However, the present disclosure is not limited to the exemplary embodiment discussed above, and a variety of modifications may be made without departing from the scope and spirit of the present disclosure.

What is claimed is:

1. An information processing apparatus comprising:
   a memory; and
   a central processing unit that receives selection of an image to be registered in a system that executes an image output process;
   wherein the central processing unit receives a change in setting related to output of the image which is selected; and
   wherein, in a case where only one image is selected, the central processing unit receives the change in setting related to output of the selected image, and such that, in a case where a plurality of images are selected, the central processing unit does not receive the change in setting related to output of the plurality of selected images and performs control such that a display screen displays a warning that the change in setting related to image output is not received.

2. The information processing apparatus according to claim 1,
   wherein, in a case where selection of the plurality of images is received by the image selection receiving unit after the change in setting related to image output is received in a state which only one image is selected, the central processing unit performs control such that the display screen displays a warning that the setting related to image output which has been changed is returned to an initial state before the change.

3. The information processing apparatus according to claim 2,
   wherein the central processing unit performs control such that the display screen continuously displays the warning that the setting related to image output which has been changed is returned to the initial state before the change until a user performs an operation.

4. The information processing apparatus according to claim 1,
   wherein the central processing unit performs control such that the warning that the change in setting related to image output is not received is dismissed from the display screen after a preset time elapses since the warning is displayed on the display screen.

5. The information processing apparatus according to claim 1,
   wherein the central processing unit controls the change receiving unit such that, even in a case where a plurality of images are selected, the central processing unit receives the change in setting related to output of the plurality of selected images in a case where a certain condition is met.

6. The information processing apparatus according to claim 5,
   wherein the certain condition is met in a case where images to be subjected to the change in setting and images not to be subjected to the change in setting are identifiable on the display section in a state in which a plurality of images are selected.

7. The information processing apparatus according to claim 1,
   wherein the central processing unit performs control such that, in a state in which selection of a plurality of images is received, one specific image selected from the plurality of images is displayed to be larger than other images on the display screen.

8. A non-transitory computer readable medium storing a program causing a computer to execute a process, the process comprising:
   receiving selection of an image to be registered in a system that executes an image output process;
   receiving a change in setting related to output of the image which is selected in the receiving of image selection; and
   performing control such that, in a case where only one image is selected in the receiving of image selection, the change in setting related to output of the selected image is received, and such that, in a case where a plurality of images are selected in the receiving of image selection, the change in setting related to output of the plurality of selected images is not received and a display screen displays a warning that the change in setting related to image output is not received.

9. An information processing apparatus comprising:
   image selection receiving means for receiving selection of an image to be registered in a system that executes an image output process;
   change receiving means for receiving a change in setting related to output of the image which is selected via the image selection receiving means; and
   control means for controlling the change receiving means such that, in a case where only one image is selected using the image selection receiving means, the change receiving means receives the change in setting related to output of the selected image, and such that, in a case where a plurality of images are selected using the image selection receiving means, the change receiving means does not receive the change in setting related to output of the plurality of selected images and performs control such that a display screen displays a warning that the change in setting related to image output is not received.

* * * * *